Aug. 14, 1962 R. A. GRAY ETAL 3,048,878
EYEGLASS LIQUID APPLICATOR DEVICE
Filed July 15, 1959
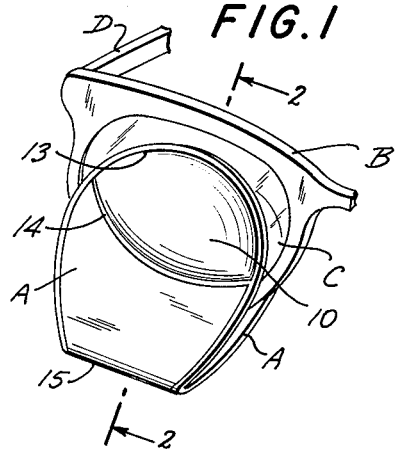
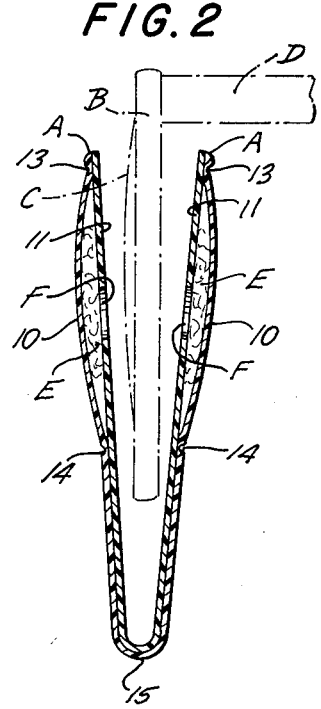
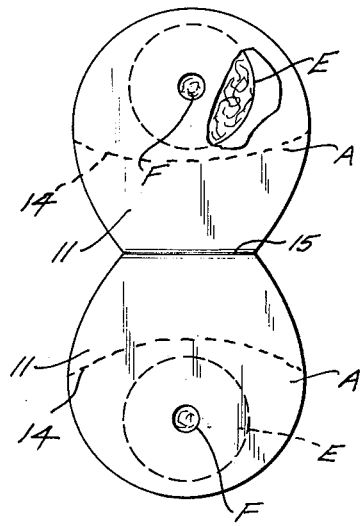
INVENTORS
FRANKLIN LAMB
LOUIS MANDEL
BY ROBERT GRAY
ATTORNEY

United States Patent Office 3,048,878
Patented Aug. 14, 1962

3,048,878
EYEGLASS LIQUID APPLICATOR DEVICE
Robert A. Gray, Franklin Lamb, and Louis Mandel, Allenhurst, N.J., assignors to Kleer-Site Corporation, Allenhurst, N.J., a corporation of New Jersey
Filed July 15, 1959, Ser. No. 827,273
4 Claims. (Cl. 15—512)

The present invention relates to an eyeglass silicone applicator device, and it particularly relates to an eyeglass silicone applicator device which may be readily used for applying a small, yet adequate, amount of an eyeglass silicone applicator fluid to opposite sides of the lens of an eyeglass.

It is among the objects of the present invention to provide a simple, readily applied eyeglass silicone applicator device for application to the lenses of glasses, which by relatively simple manipulation will apply a predetermined quantity of silicone applicator liquid to each side of the eyeglass lens.

Another object is to provide a simple pouch-like structure which may be readily applied simultaneously to both sides of the lens of an eyeglass to apply a silicone applicator liquid thereto.

A further object of the present invention is to provide a simple method of applying proportionate or substantially metered quantities of an eyeglass silicone applicator fluid to the opposite sides of the lens of an eyeglass.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, the applicator device consists of two foldable sections connected along a central fold line, each of which carries a liquid reservoir.

In the preferred form of the invention, the liquid reservoir consists of an absorbent pad sponge or layer of woven or non-woven material, which has been saturated with a silicone liquid for eyeglass silicone applicator purposes.

The pouch may be made of various types of leather or imitation leather materials, and it is desirable to use a film, which, while it has body and resiliency, nevertheless will not be affected by normal silicone eyeglass silicone applicator fluids.

Desirably the pouch is so sewn or heat sealed together as to form a U structure, which may be readily placed on either side of the lens and which will permit, when the two edges are pressed together, the passage of a limited amount of silicone applicator liquid onto the opposite sides of the lens.

The central meter opening is desirably so arranged that it will only uncover a small section at the middle of the pad, with the result that this section will be capable of releasing the fluid.

As soon as the pad is released, the stored up liquid in the ball of the pad will saturate the entire pad again with liquid, so that an additional supply will be available at the central part of the pad.

The pad is desirably ridged around the edges thereof so as to give extra strength and rigidity along the edges and to hold the pad in more or less channel shape so that it will have a clip-like form and be readily inserted upon the lens of an eyeglass from the top, bottom or either side.

Desirably the pad is enclosed in a pocket which will be formed adjacent the ends of the folder, with the pad being centrally positioned in the pouch and being subjected to a slight pressure when the two ends of the U-shaped structure are pressed together upon the lens of the eyeglass.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 1 is a top perspective view showing the manner of application of the device of the present application to the lens of an eyeglass.

FIG. 2 is a transverse sectional view upon the line 2—2 of FIG. 1.

FIG. 3 is an inside elevational view of the pouch in an outwardly folded position.

Normally the pouch as shown in FIGS. 1 to 3 may consist of two layers of a thin flexible sheet material having substantial body, whether it be of a thin leather stitched together at the edges or preferably of a thin vinyl polymer sheet material of either a vinyl chloride or vinylidene chloride or a co-polymer of vinyl chloride and vinyl acetate.

Polyethylene terephthalate is desirably not used because of the difficulty of forming the edge seal, but it may be used in combination with the vinyl polymer film to give additional strength. It is also possible to use polyethylene film.

Desirably, the inside film of the pouch A is stronger and thicker than the outside film and is utilized to give a set or U-shaped conformation to the pouch. The inside film may be one and one half to two times as thick as the outside film.

In the form shown the U-shaped device or clipped-shaped device has two sections A—A, which are separated by the fold line 15.

The inside sections 11 are substantially integral with each other across the fold line, and they are sealed, as indicated at the edges 13, to give a relatively thickened bead so that the clip member is beaded outwardly around its entire periphery and across the fold 15, as indicated at 13 in FIG. 1.

The open or receptacle sections E are desirably sealed off from the fold section 15 by means of the seals or contact lines 14, which extend arcuately, as indicated in FIG. 1, between the beaded edges 13. The open sections or receptacle portions 10 have a sector shape and extend from side to side of the unit, and desirably are much wider than their height.

Centrally of each receptacle portion 10 is positioned a circular silicone saturated pad E, which is slightly spaced from the upper edge 13 and the lower seal line 14 and relatively widely spaced from the end corners of the recessed portion 10.

These pads E have a small central portion exposed, as indicated at F, with the sides of the opening F acting as a metering device to regulate the amount of silicone liquid which can flow onto the lens.

Although the pad is shown folded outwardly, as indicated in FIG. 3, it will normally take the U-shape conformation, as shown in FIG. 2, so that pressure of the fingers on the outside of the receptacle portions 10 will result in the pads E being pressed together against the lens C and releasing a slight amount of silicone liquid on each side of the glass through the metering opening F.

The metering openings F may be made of various sizes apply the U-shaped or clipped-shaped device to the lens, As indicated in FIGS. 1 and 2, it is readily possible to apply the U-shaped or clipped-shaped device to the lens, regardless of the position of the frame B around the lens C and/or the temple members D. It is thus apparent that the applicant has provided a simple readily applicable eyeglass silicone applicator device which may be widely utilized in coating eyeglasses and applying silicone applicator liquids thereto.

The device of FIGS. 1 to 3 may be conveniently carried in the pocket without release of the liquid and the sides of the receptacle portion 10 will be so formed as a result of the beading 13 and the edge seal 14 as to bulge apart and not exert any pressure upon the pad E until it is actually applied to the lens. As a result, the liquid will be retained in the folded sponge-like fabric or woven or non-woven material E and will only be released upon pressure between the fingers as both receptacle portions and both openings E are pressed against the central portions of the lens.

Although the two sections A are shown of substantially spherical shape to match the normal oval or circular shape of an ordinary lens C, it is to be understood that they also may be made of other polygonal, elliptical or circular shapes.

Furthermore, for decorative purposes, the exterior face of the outside film may be decorated or embellished to make the device an attractive device to have in the pocketbook and to carry about.

The unusual feature of the present device is that the silicone applicator liquid will not be released unless the device is pressed against a rigid intervening member, such as a lens structure C.

While there has been herein described a preferred form of the invention, it should be understood that the same may be altered in details and in relative arrangement of parts within the scope of the appended claims.

The present device is particularly suitable for metering small quantities of a liquid from the central portions of an eyeglass. The device of the present application acts as an applicator and not as a polisher and when the liquid is subsequently spread by a cloth or a handkerchief it will leave a solution upon both sides of each of the lenses which will maintain a high clarity and keep the lenses free of obscuring material.

Having now particularly described and ascertained the nature of the invention, and in what manner the same is to be performed, what is claimed is:

1. An applicator for centrally applying silicone liquid in metered quantities and in predetermined areas to opposite sides of an eyeglass lens comprising a flexible liquid impenetrable folded member having end enclosure members and connected in a folded bridge, each end closure member having an outer wall without openings and an inner wall with a relatively small central metering opening, said wall being peripherally joined in liquid tight fashion and an absorbent pad positioned between said walls to release the silicone liquid when the two enclosure members are pressed together against the lens impressing the absorbent pad to release liquid only through the metering opening while the rest of the absorbent pad is held against the outer and inner walls and cannot release silicone liquid.

2. The applicator of claim 1, wherein the inner walls are initially flat and the outer walls are initially bulged where they are to be pressed together between the fingers, and the shape of the enclosures being approximately circular, the portions of the enclosures on either side of a diameter which is parallel to said folded bridge being arcuate, the dimension of each of said enclosures measured on said diameter being maximum and the dimension of each of said enclosures measured transversely to said diameter being minimum, with the metering openings both being circular and centrally disposed in their respective inside faces.

3. The applicator of claim 1, the walls and bridge being formed of thin flexible vinyl polymer sealed around the edges of the enclosure members and along the edges of the bridge.

4. A silicone liquid applicator for eyeglasses lens comprising two enlarged circular envelope members composed of double layer flexible plastic film sheet members with a thin opening therebetween and said members having about the same diameter as the eyeglass lens and having a connecting integral double sheet plastic layer connecting bridge for said envelopes of lesser width than said diameter with the layers in the bridge integrally joined together, said envelope members having initially flat inside faces to be pressed against and on opposite sides of the eyeglass lenses and having initially slightly bulged outside faces, absorbent circular silicone liquid saturated thin disks centrally positioned in said envelopes and metering openings centrally positioned in said inside faces.

References Cited in the file of this patent

UNITED STATES PATENTS 1,702,172 Rennie _____ Feb. 12, 1929

FOREIGN PATENTS 285,197 Switzerland _____ Dec. 16, 1952
806,980 Great Britain _____ Jan. 7, 1959